United States Patent
Hosoda et al.

(10) Patent No.: US 6,659,470 B2
(45) Date of Patent: Dec. 9, 2003

(54) OIL SEAL OF HYDRAULIC SHOCK ABSORBER

(75) Inventors: Hironobu Hosoda, Saitama (JP); Noriaki Maneyama, Saitama (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/041,380

(22) Filed: Nov. 7, 2001

(65) Prior Publication Data

US 2002/0092722 A1 Jul. 18, 2002

(30) Foreign Application Priority Data

Nov. 8, 2000 (JP) ........................................ 2000-341099

(51) Int. Cl.$^7$ ............................................... F16J 15/32
(52) U.S. Cl. ..................... 277/560; 277/565; 277/573; 277/944; 277/916; 277/437
(58) Field of Search ................... 277/560, 562, 277/436, 437, 444, 944, 916, 565, 566, 572, 573; 188/327.17, 322.18

(56) References Cited

U.S. PATENT DOCUMENTS

| | | | | |
|---|---|---|---|---|
| 3,621,952 A | * | 11/1971 | Long et al. | 188/322.17 |
| 3,672,690 A | * | 6/1972 | Berens | 277/559 |
| 4,255,296 A | * | 3/1981 | Ogawa et al. | 524/255 |
| 4,357,026 A | * | 11/1982 | Panchetti | 277/560 |
| 4,588,309 A | * | 5/1986 | Uyehara et al. | 384/94 |
| 4,987,826 A | * | 1/1991 | Deppert et al. | 92/168 |
| 5,167,419 A | * | 12/1992 | Robertson | |
| 5,438,095 A | * | 8/1995 | Liles et al. | 524/785 |
| 5,649,709 A | * | 7/1997 | Munekata et al. | 277/560 |
| 5,664,651 A | * | 9/1997 | Miura et al. | 188/322.17 |
| 5,695,198 A | * | 12/1997 | Iwamoto et al. | 277/402 |
| 5,958,571 A | * | 9/1999 | Omura | 428/316.6 |
| 6,045,138 A | * | 4/2000 | Kanzaki | 277/562 |

FOREIGN PATENT DOCUMENTS

| | | | |
|---|---|---|---|
| GB | 2085096 A | * | 4/1982 |
| JP | 53136051 A | * | 11/1978 |
| JP | 53739 | | 1/1993 |
| JP | 674352 | | 3/1994 |

* cited by examiner

Primary Examiner—Alison Pickard
(74) Attorney, Agent, or Firm—Orum & Roth

(57) ABSTRACT

In an oil seal of a hydraulic shock absorber, the oil seal is made of a nitrile rubber of a low nitrile, and an inner diameter of a second lip is set to be smaller within a range between 0.3 and 1.0 mm φ than an outer diameter of a piston rod.

5 Claims, 6 Drawing Sheets

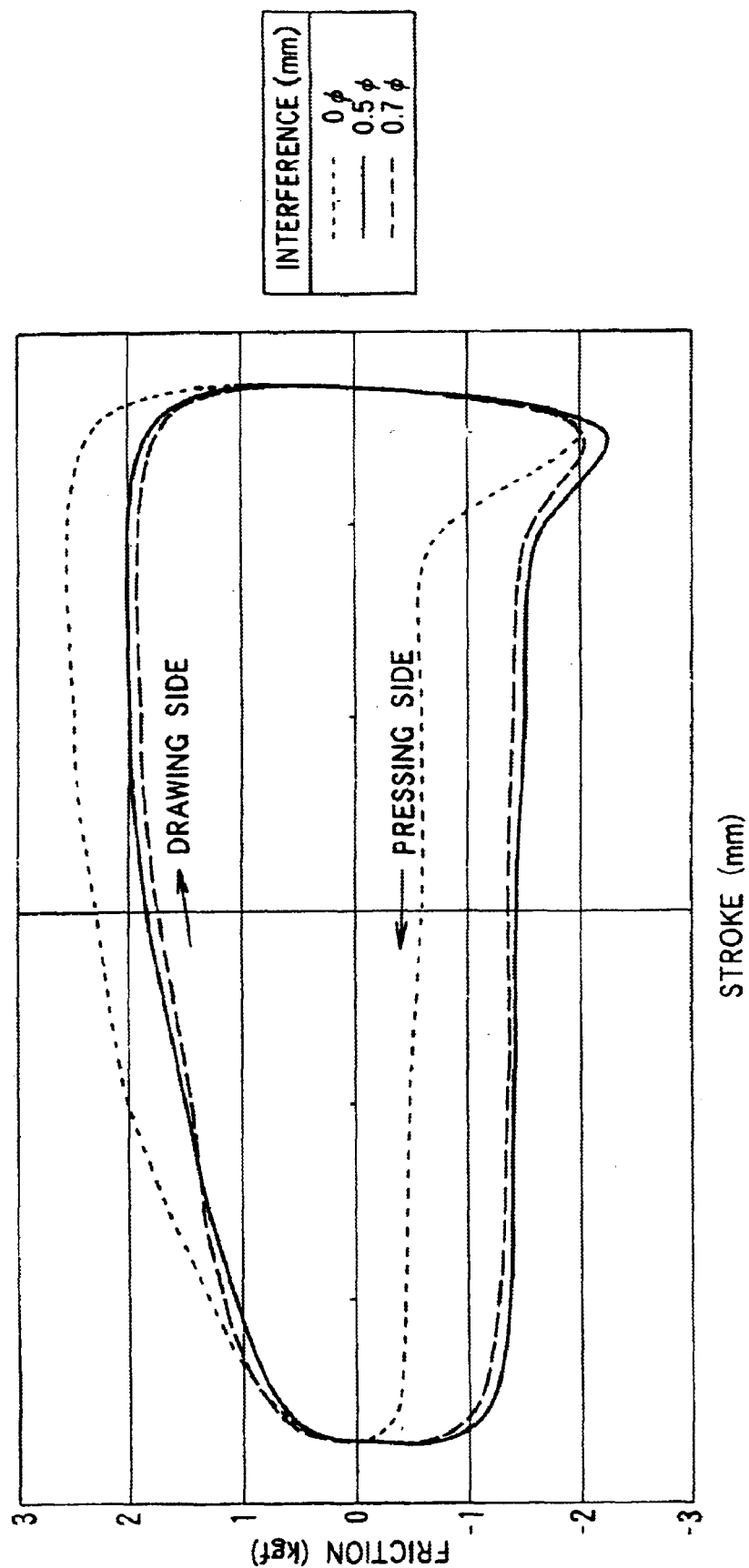

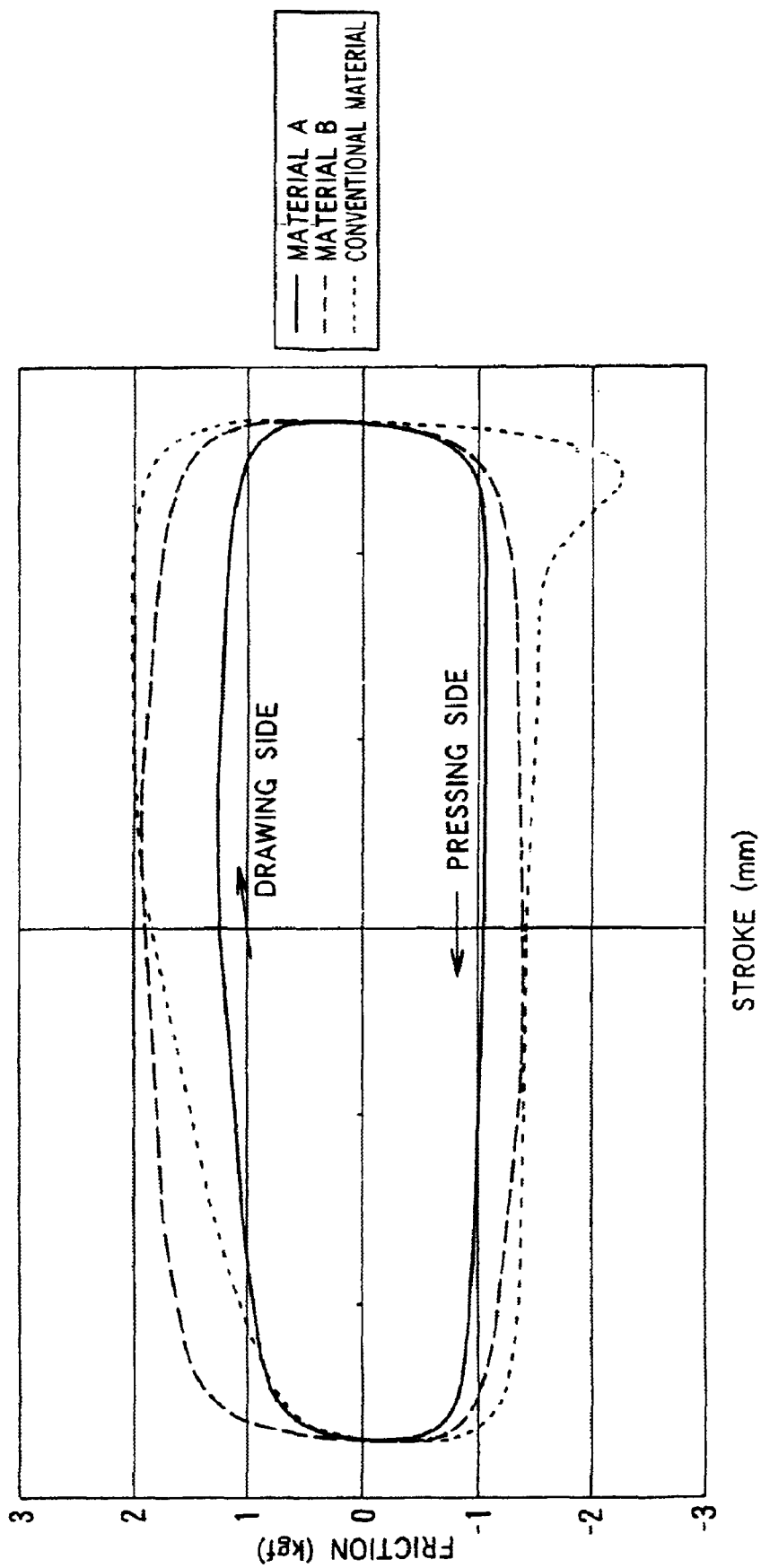

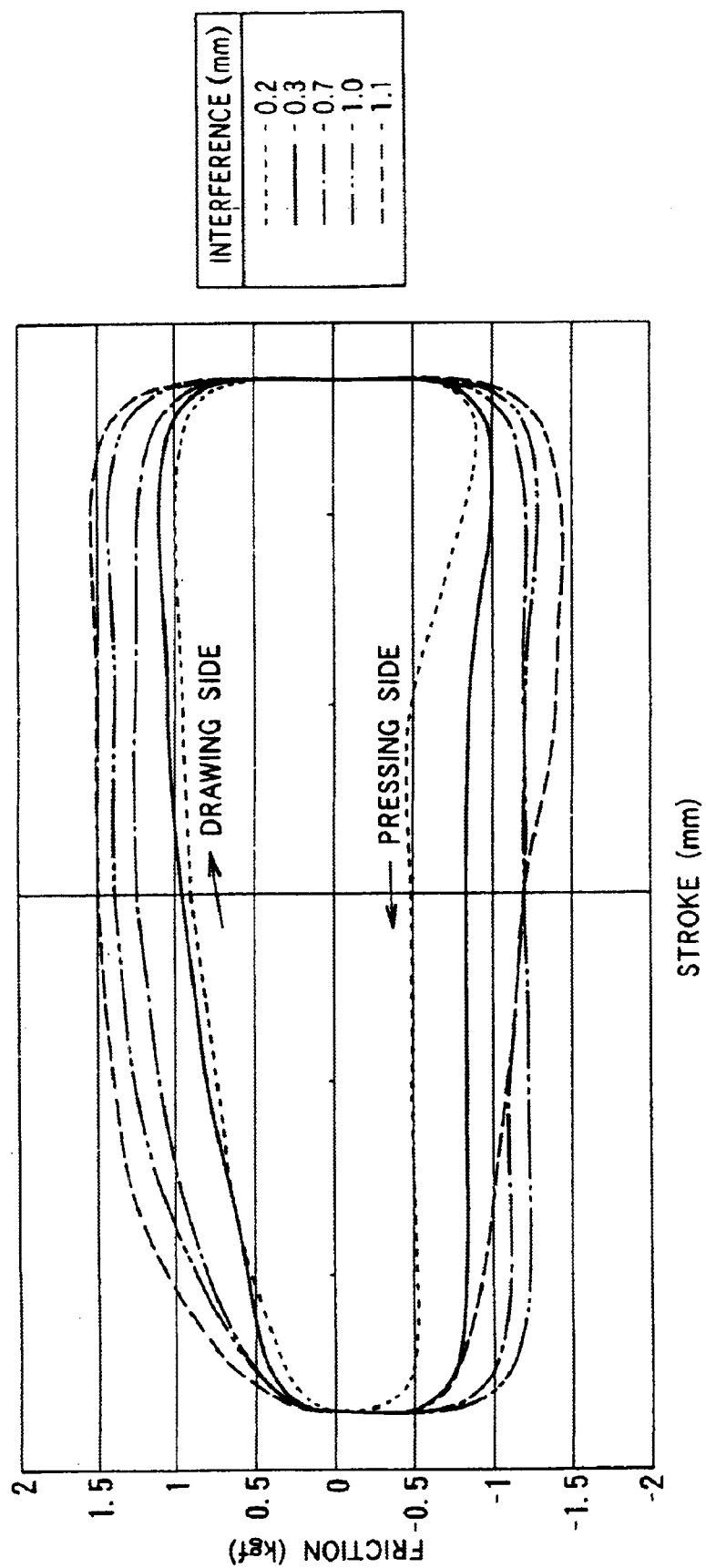

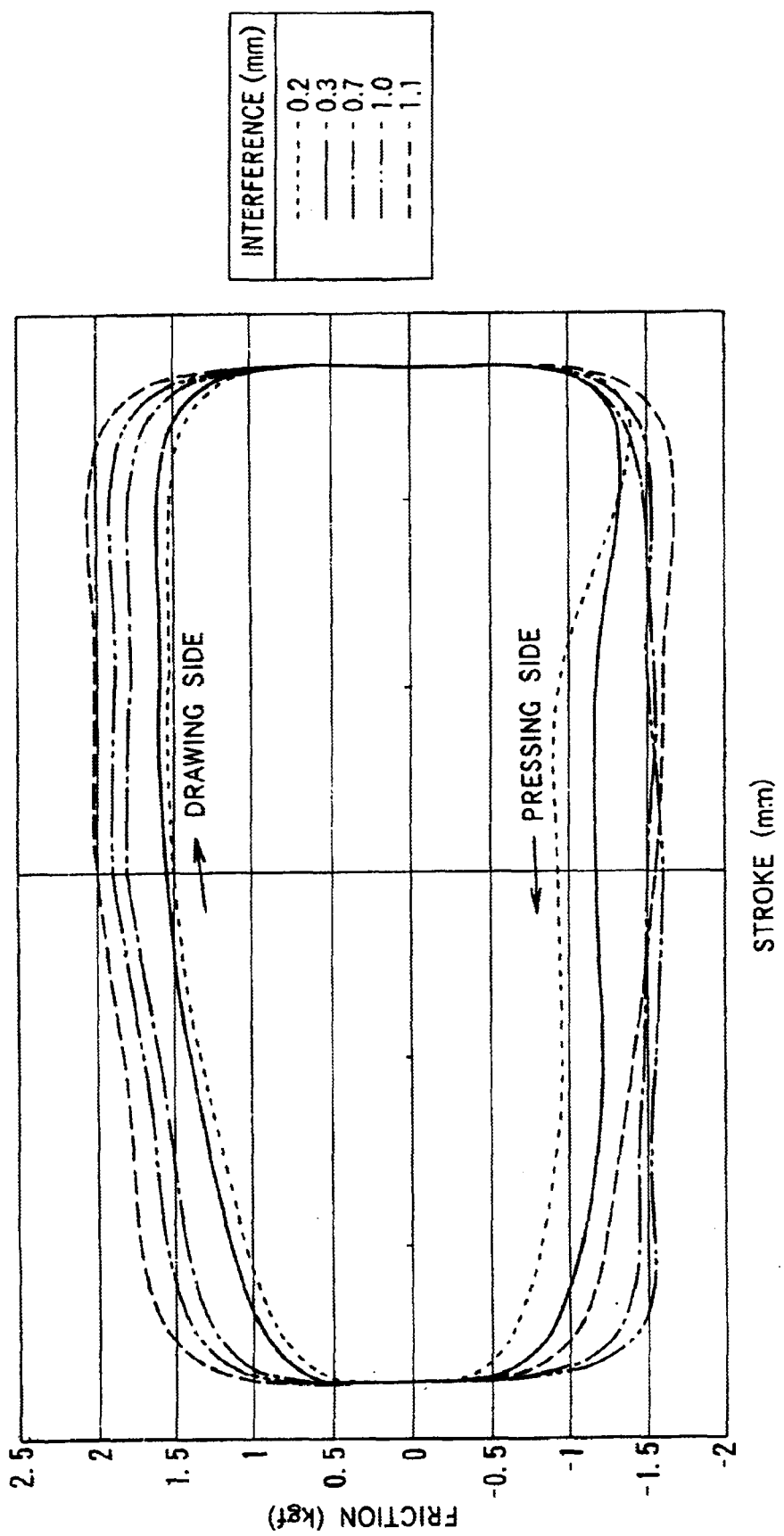

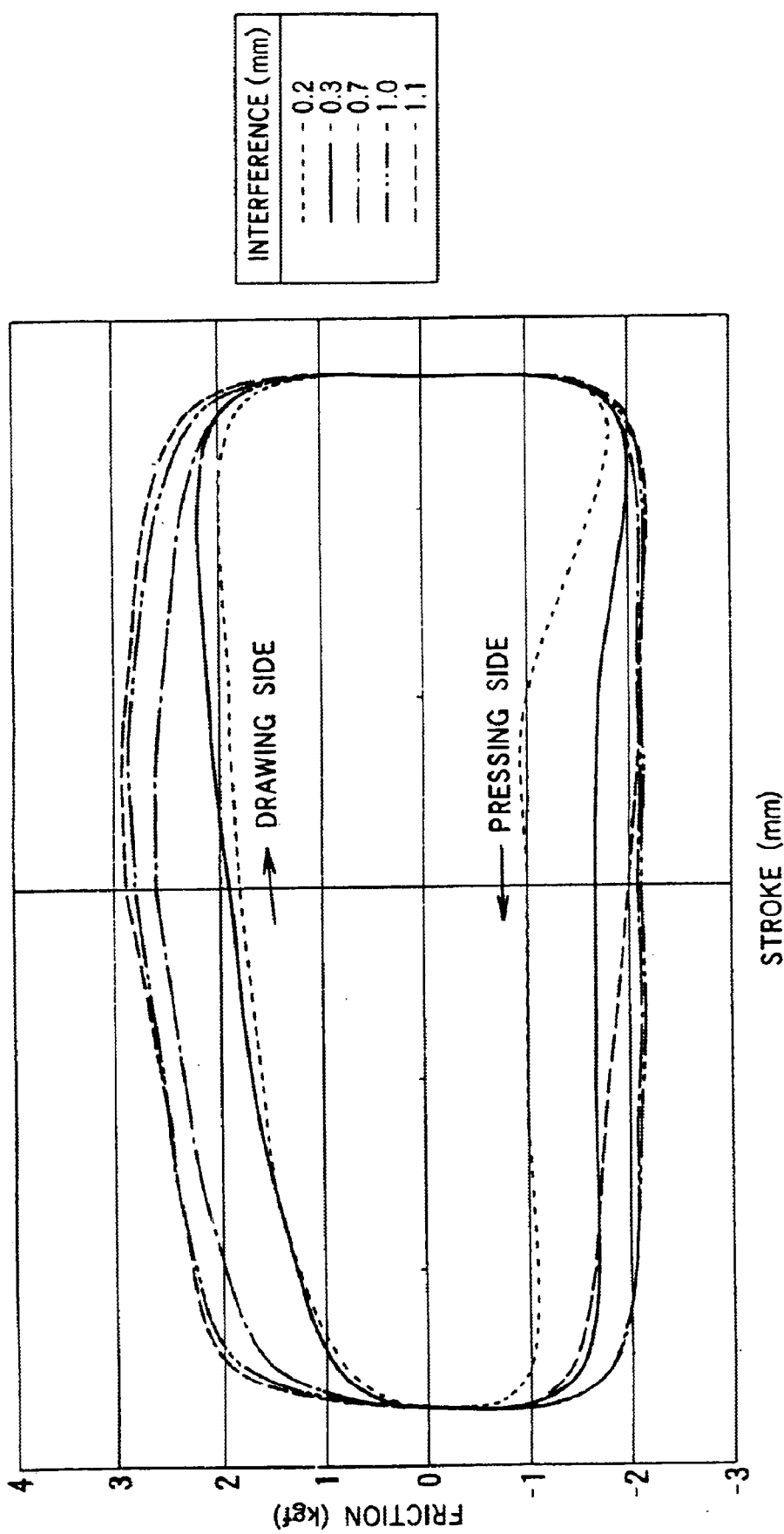

OIL SEAL OF HYDRAULIC SHOCK ABSORBER

BACKGROUND OF THE INVENTION

1. Field of the Invention

The present invention relates to an oil seal of a hydraulic shock absorber.

2. Description of the Related Art

In a hydraulic shock absorber for a vehicle, as described in Japanese Utility Model Application Laid-Open No. 5-3739, an oil seal is sealed in an opening portion of a cylinder, and a first lip and a second lip of the oil seal are slidably contact with a piston rod at two axial positions in a side of an oil chamber of the cylinder and a side of an outer portion thereof.

In a damping property of the hydraulic shock absorber, various kinds of frictions or the like are added to a hydraulic damping force generated by a damping force generating valve, whereby a total property is indicated.

According to the conventional hydraulic shock absorber, an unstable riding feeling such as a waft feeling is given on a flat road surface, in particular, when the hydraulic damping force is low, so that it is not so preferable.

SUMMARY OF THE INVENTION

An object of the present invention is to improve a riding feeling of a vehicle in a hydraulic shock absorber by paying attention to a shape of an oil seal and a material.

The present invention relates to an oil seal of a hydraulic shock absorber provided with a first lip and a second lip which are sealed in an opening portion of a cylinder and are slidably in contact with a piston rod at two axial positions in a side of an oil chamber and a side of an outer portion of the cylinder, wherein the oil seal is made of a nitrile rubber of a low nitrile, and wherein an inner diameter of the second lip is set to be smaller within a range between 0.3 and 1.0 mm φ than an outer diameter of the piston rod.

BRIEF DESCRIPTION OF THE DRAWINGS

The present invention will be more fully understood from the detailed description given below and from the accompanying drawings which should not be taken to be a limitation on the invention, but are for explanation and understanding only.

FIG. 2 is a graph showing a relation between an interference and a friction property;

FIG. 3 is a graph showing a relation between a material and the friction property;

FIG. 4 is a graph showing the friction property of an example (having a rod diameter of 12.5 mm φ) and a comparative example;

FIG. 5 is a graph showing the friction property of an example (having a rod diameter of 18 mm φ) and a comparative example; and FIG. 6 is a graph showing the friction property of an example (having a rod diameter of 22 mm φ) and a comparative example.

DESCRIPTION OF THE PREFERRED EMBODIMENTS

Figure 1:
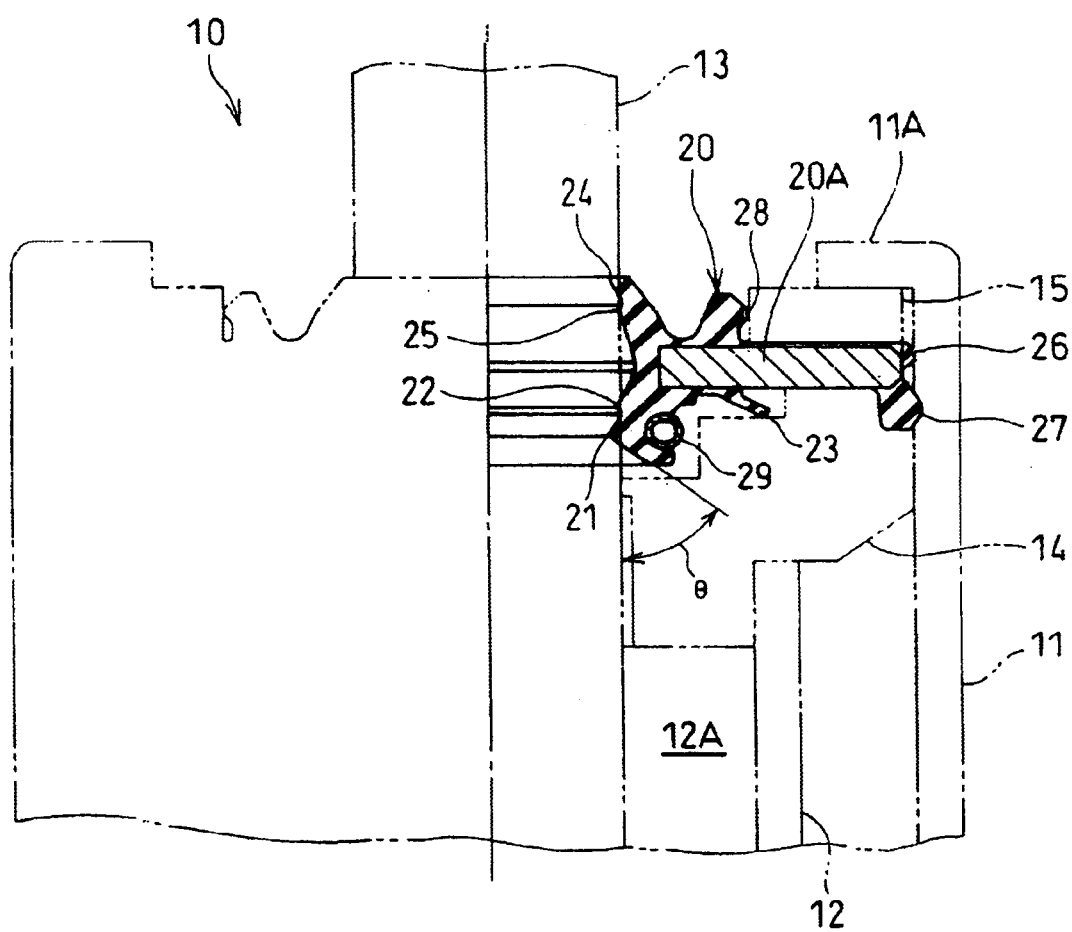
FIG. 1 is a cross sectional view showing an oil seal sealing portion of a hydraulic shock absorber.

FIG. 1 shows a main portion of a hydraulic shock absorber 10 to which the present invention is applied. The hydraulic shock absorber 10 is structured such that a cylinder 12 is inserted to an outer tube 11 and an oil seal 20 is sealed in an opening portion through which a piston rod 13 of the cylinder 12 is inserted. A rod guide 14 is inserted and attached to the outer tube 11 and an upper end opening portion of the cylinder 12, and the oil seal 20 is inserted and attached to an upper end portion of the rod guide 14 so as to be fixed by a caulked portion 11A of the outer tube 11 via a washer 15.

The oil seal 20 is provided with a first lip 21, a second lip 22, a check lip 23, a first dust lip 24, a second dust lip 25, a first outer peripheral lip 26, a second outer peripheral lip 27 and a washer holding portion 28, made of an NBR respectively, by baking them in a core metal 20A, and a ring-like spring 29 is fastened to a back surface of the first lip 21. The first lip 21 and the second lip 22 are slidably in contact with the piston rod 13 at two axial positions in a side of an oil chamber 12A of the cylinder 12 and a side of an outer portion thereof. Reference symbol θ denotes an oil level angle that a lip-forming surface facing to the oil chamber 12A of the first lip 21 forms with respect to an outer periphery of the piston rod 13.

A description will be given of a result of an experiment executed with respect to the oil seal 20 of the hydraulic shock absorber 10. In this case, in experiments 1 to 3, a diameter of the piston rod in the hydraulic shock absorber is set to 12.5 mm φ, an inner diameter of the first lip is set to 11.0 mm φ, and an inner diameter of the second lip is set as mentioned below, respectively.

Experiment 1

Interference and Friction Property
(TABLE 1 and FIG. 2)

On the basis of a conventional example 1 and comparative examples 1 and 2, a relation between an interference and a friction property is searched, and the results in TABLE 1 and FIG. 2 are obtained.

TABLE 1

Experiment 1 (shape) (rod diameter 12.5 φ) (Unit: mm)

| | Material | Interference of second lip | Oil level angle | Property |
|---|---|---|---|---|
| Conventional example 1 | conventional material | 0 | 46 | no good |
| Comparative example 1 | conventional material | 0.5 φ | 46 | available |
| Comparative example 2 | conventional material | 0.7 φ | 46 | available |

The conventional example 1 is structured such that NBR of a middle nitrile (having an amount of nitrile 25 to 30 weight %) (or a middle or high nitrile (having an amount of nitrile 31 to 35 weight %)) is employed as a material, and the second lip has no interference with respect to the piston rod (having a rod diameter of 12.5 mm φ). The comparative examples 1 and 2 are structured such that the same material as that of the conventional example 1 is employed, and the second lips thereof respectively have interferences 0.5 mm φ and 0.7 mm φ with respect to the piston rod (having a rod diameter of 12.5 mm φ).

In the conventional example 1, the friction property is no good (x) as shown in TABLE 1. That is, in the conventional example 1, with respect to the rod diameter of 12.5 mm φ, the inner diameter of the first lip is 11.0 mm φ, and the inner diameter of the second lip is 12.5 mm φ, and further the structure is made such that the first lip is closely sealed in the piston rod, and the second lip is provided as a backup of the first lip; however, the second lip has no interference with respect to the piston rod. Accordingly, since the first lip at a position apart from the core metal of the oil seal easily deforms, and the first lip deforms in a compressing direction against the core metal at a drawing process of the piston rod, in a direction of being drawn into the piston rod so as to close the seal, an amount of compressing deformation is increased. On the contrary, at a pressing process of the piston rod, since the first lip deforms in an extending direction against the core metal, in a direction of opening the seal, an amount of compressing deformation is a little. Accordingly, a friction waveform is formed as shown in FIG. 2 so that the friction is increased together with the stroke at the drawing process of the piston rod, the friction is reduced together with the stroke at the pressing process, and the friction instantaneously increases at a change point from the drawing process to the pressing process, at the process change point so as to overshoot. In the change point from the pressing process of the piston rod to the drawing process, an amount of the compressing deformation of the first lip is a little so as not to overshoot. In the friction property mentioned above, a stick slip phenomenon on the basis of the overshoot of the friction is generated at the change point from the drawing process of the piston rod to the pressing process, and a waft riding feeling is given.

In the comparative examples 1 and 2, the friction property becomes available as shown in TABLE 1. That is, in the comparative examples 1 and 2, with respect to the rod diameter of 12.5 mm φ, the inner diameter of the first lip is 11.0 mm φ, and respective interferences of 0.5 mm φ and 0.7 mm φ are applied to the inner diameter of the second lip. Accordingly, in the comparative examples 1 and 2, as shown in FIG. 2, in comparison with the conventional example 1, the friction in the drawing process is reduced and the friction in the pressing process is increased although they are not sufficient, whereby a difference of the frictions between the pressing process and the drawing process is lost, and an overshoot of the friction at the change point from the drawing process to the pressing process is reduced, so that it is possible to recognize an advantage obtained by applying the interference to the second lip.

Experiment 2

Material and Friction Property
(TABLE 2 and FIG. 3)
(TABLE 3)

On the basis of an example 1, conventional examples 1 and 2, and comparative examples 1 to 3, a relation between a material and a friction property is searched, and the results in TABLE 2 and FIG. 3 are obtained.

TABLE 2

Experiment 2 (material) (rod diameter 12.5 φ)   (Unit: mm)

| | material | Interference of second lip | Oil level angle | Prop- erty | Dura- bility | Judge- ment |
|---|---|---|---|---|---|---|
| Comparative example 2 | A material | 0.5 φ | 55 | OK | NG | NG |
| Comparative example 3 | B material | 0.5 φ | 55 | OK | NG | NG |
| Conventional example 2 | Conven- tional material | 0.5 φ | 55 | NG | OK | NG |

TABLE 2-continued

Experiment 2 (material) (rod diameter 12.5 φ)   (Unit: mm)

| | material | Interference of second lip | Oil level angle | Prop- erty | Dura- bility | Judge- ment |
|---|---|---|---|---|---|---|
| Example 1 | A material | 0.5 φ | 50 | OK | OK | OK |
| Comparative example 1 | B material | 0.5 φ | 50 | OK | NG | NG |
| Conventional example 1 | Conven- tional material | 0.5 φ | 50 | NG | OK | NG |

In the example 1, the comparative example 1 and the conventional example 1, the second lips thereof have interferences 0.5 mm φ with respect to the piston rod (having a rod diameter of 12.5 mm φ), and an oil level angle of the first lip is set to be the same 50 degrees. The material thereof is set to a material A of NBR of a low nitrile (having an amount of nitrile 24 weight % or less) in the example 1, to a material B of NBR of a low nitrile (having an amount of 24 weight % or less) in the comparative example 1, and to an NBR of a middle nitrile (having an amount of 25 weight % or more) in the conventional example 1. In the friction waveforms of the example 1, the comparative example 1 and the conventional example 1 in this case, are formed as shown in FIG. 3, and the friction property is made the same between the pressing process and the drawing process by setting the material to the material A mentioned above in addition to giving a certain interference to the second lip, so that it can be recognized that there is shown a rectangular ideal waveform having the same friction even at the process change point between the pressing process and the drawing process. According to the example 1, the hydraulic shock absorber can obtain a substantially uniform friction all over the processes from the drawing process of the piston rod to the pressing process, it is possible to avoid a waft unstable riding feeling such as to prevent a stick slip phenomenon from being generated on the basis of the overshooting of the friction at the change point from the drawing process to the pressing process or the like, and it is possible to improve a riding feeling.

In this case, the data of the material A of NBR of the low nitrile employed in the example 1, the material B of NBR of the low nitrile employed in the comparative example 1, and the conventional material of NBR of the middle nitrile employed in the conventional example 1 are shown as TABLE 3. In basic physical properties, hardness, tensile strength, elongation, 100% MO (modulus) and impact resilience, no significant difference exists in the conventional material, the material A and the material B. However, since the material A contains a chrome oxide, the material A is more excellent than the material B in an abrasion resistance and can satisfy an endurance condition; however, since chrome oxide is not contained in the material B, it is assumed that the material B does not satisfy the endurance condition. As the abrasion resisting material, an iron oxide or the like may be employed in addition to the chrome oxide.

TABLE 3

|  | Conventional material | A material | B material |
|---|---|---|---|
| Hardness (JISA) | 80 | 79 | 85 |
| Tensile strength Mpa | 22.3 | 23.0 | 26.0 |
| Elongation % | 220 | 230 | 260 |
| 100% MO (Mpa) | 7.8 | 8.8 | 8.5 |
| Amount of nitrile | 30 | 22 | 22 |
| Impact resistance % | 27 | 31 | 29 |
| Abrasion resisting material | exist | exist | nothing |

Further, as a result of applying the test to a material in which the chrome oxide or the iron oxide is blended as the abrasion resisting material without increasing a deterioration preventing agent in the material B, the same results as those of the material A can be obtained, so that a material to which the abrasion resisting material is added may be employed.

In this case, a carbon black is normally contained as the abrasion resisting material, however, the abrasion resistance will be further improved by containing the chrome oxide or the iron oxide in addition to the carbon black, as the abrasion resisting material. It is preferable that the chrome oxide or the iron oxide is contained in the carbon black at a degree of 30 to 60 weight %. When there is too much chrome oxide or iron oxide, there is a risk that some problems are generated in the strength and workability of the rubber.

Further, since an abrasion of the seal can be prevented by improving the abrasion resistance, durability can be improved.

In this case, the comparative examples 2 and 3 respectively correspond to structures in which the oil level angles of the example 1 and the comparative example 1 are changed from 50 degrees to 55 degrees, and the conventional example 2 corresponds to a structure in which the oil level angle of the conventional example 1 is changed from 50 degrees to 55 degrees. It is recognized that the comparative examples 2 and 3 are not changed in the friction property in comparison with the example 1 and the comparative example 1 due to the change of the oil level angle; however, the durability deteriorates.

Experiment 3

Oil Level Angle and Durability
(TABLE 4)

On the basis of the examples 1 to 3 and the comparative examples 1 to 4, a relation between an oil level angle of the first lip and durability is searched, and results in TABLE 4 are obtained.

TABLE 4

Experiment 3 (oil level angle) (rod diameter 12.5 φ) (Unit: mm)

|  | Oil level angle | Interference of second lip | Material | Property | Durability | Judgement |
|---|---|---|---|---|---|---|
| Example 1 | 45 | 0.7 φ | A material | OK | OK | OK |
| Example 2 | 50 | 0.7 φ | A material | OK | OK | OK |
| Example 3 | 54 | 0.7 φ | A material | OK | OK | OK |
| Comparative example 1 | 44 | 0.7 φ | A material | OK | NG | NG |
| Comparative example 2 | 55 | 0.7 φ | A material | OK | NG | NG |
| Comparative example 3 | 40 | 0.7 φ | A material | OK | NG | NG |
| Comparative Example 4 | 60 | 0.7 φ | A material | OK | NG | NG |

In all of the examples 1 to 3 and the comparative examples 1 to 4, the second lip has an interference 0.7 mm φ with respect to the piston rod (the rod diameter 12.5 mm φ), and the same material A of the NBR of the low nitrile (having an amount of nitrile of 24 weight % or less) mentioned above is employed as the material thereof. The oil level angles of the first lip are respectively set to 45 degrees, 50 degrees, and 54 degrees in the examples 1 to 3, and respectively set to 44 degrees, 55 degrees, 40 degrees, and 60 degrees in the comparative examples 1 to 4. In this case, the friction property is OK in all of the examples 1 to 3 and the comparative examples 1 to 4; however, the durability is OK in only the examples 1 to 3. It is recognized that a preferable range of the oil level angle of the first lip is between 45 and 54 degrees.

The oil level angle is a seal cut angle applied to the lip-forming surface in the first lip, and if the oil level angle is increased, a seal angle becomes an acute angle. An oil scraping performance of the first lip and a performance against an oil leakage are changed due to the oil level angle. The durability is improved and the oil scraping performance is improved by setting the oil level angle to a range between 45 and 54 degrees. The durability has large stroke durability and fine stroke durability, and the oil level angle satisfying both durability requirements are within a range between 45 and 54 degrees. When increasing the oil level angle to be equal to or more than 55 degrees, the fine stroke durability becomes no good, and when reducing it to be equal to or less than 44 degrees, the large stroke durability becomes no good.

Experiment 4

(TABLE 5)

In the experiment 4, the piston rod diameter of the hydraulic shock absorber is set to three kinds comprising 12.5 mm φ, 18 mm φ and 22 mm φ, and the inner diameter of the first lip is set to 11.0 mm φ, 16.5 mm φ and 20.5 mm φ with respect to each of the piston rod diameters.

In the conventional example 1, the examples 1, 11 and 21, and the comparative examples 1, 11, 21 and 31, with respect to the structure having the piston rod diameter 12.5 mm φ, the interference, the material and the oil level angle of the second lip are set as shown in TABLE 5, whereby results of a friction property and a durability shown in TABLE 5, and a friction waveform shown in FIG. 4 are obtained.

TABLE 5

Experiment 4 (total)    (Unit: mm)

| | Applied rod diameter | Interference of second lip | Oil level angle | Material | Property | Durability | Judgement |
|---|---|---|---|---|---|---|---|
| Conventional example 1 | 12.5 φ | 0 | 46 | Conventional material | NG | OK | NG |
| Conventional example 2 | 18 φ | 0 | 46 | Conventional material | NG | OK | NG |
| Conventional example 3 | 22 φ | 0 | 46 | Conventional material | NG | OK | NG |
| Example 1 | 12.5 φ | 0.3 φ | 50 | A material | OK | OK | OK |
| Example 2 | 18 φ | 0.3 φ | 50 | A material | OK | OK | OK |
| Example 3 | 22 φ | 0.3 φ | 50 | A material | OK | OK | OK |
| Example 11 | 12.5 φ | 0.7 φ | 50 | A material | OK | OK | OK |
| Example 12 | 18 φ | 0.7 φ | 50 | A material | OK | OK | OK |
| Example 13 | 22 φ | 0.7 φ | 50 | A material | OK | OK | OK |
| Example 21 | 12.5 φ | 1.0 φ | 50 | A material | OK | OK | OK |
| Example 22 | 18 φ | 1.0 φ | 50 | A material | OK | OK | OK |
| Example 23 | 22 φ | 1.0 φ | 50 | A material | OK | OK | OK |
| Comparative example 1 | 12.5 φ | 0.5 φ | 50 | Conventional material | NG | OK | NG |
| Comparative example 2 | 18 φ | 0.5 φ | 50 | Conventional material | NG | OK | NG |
| Comparative example 3 | 22 φ | 0.5 φ | 50 | Conventional material | NG | OK | NG |
| Comparative example 11 | 12.5 φ | 0.5 φ | 50 | B material | OK | NG | NG |
| Comparative example 12 | 18 φ | 0.5 φ | 50 | B material | OK | NG | NG |
| Comparative example 13 | 22 φ | 0.5 φ | 50 | B material | OK | NG | NG |
| Comparative example 21 | 12.5 φ | 0.2 φ | 50 | A material | NG | OK | NG |
| Comparative example 22 | 18 φ | 0.2 φ | 50 | A material | NG | OK | NG |
| Comparative example 23 | 22 φ | 0.2 φ | 50 | A material | NG | OK | NG |
| Comparative example 31 | 12.5 φ | 1.1 φ | 50 | A material | NG | OK | NG |
| Comparative example 32 | 18 φ | 1.1 φ | 50 | A material | NG | OK | NG |
| Comparative example 33 | 22 φ | 1.1 φ | 50 | A material | NG | OK | NG |

In the conventional example 2, the examples 2, 12 and 22, and the comparative examples 2, 12, 22 and 32, with respect to the structure having the piston rod diameter 18 mm φ, the interference, the material and the oil level angle of the second lip are set as shown in TABLE 5, whereby results of a friction property and a durability shown in TABLE 5, and a friction waveform shown in FIG. 5 are obtained.

In the conventional example 3, the examples 3, 13 and 23, and the comparative examples 3, 13, 23 and 33, with respect to the structure having the piston rod diameter 22 mm φ, the interference, the material and the oil level angle of the second lip are set as shown in TABLE 5, whereby results of a friction property and a durability shown in TABLE 5, and a friction waveform shown in FIG. 6 are obtained.

According to TABLE 5 and FIGS. 4 to 6, in the conventional examples 1 to 3, since there is no interference of the second lip in various kinds of piston rod diameters, the friction largely overshoots at the change point from the drawing process of the piston rod to the pressing process, and the friction property becomes no good.

In the comparative examples 1 to 3, since the conventional material is employed even when the interference is applied to the second lip in various kinds of piston rod diameters, the friction largely overshoots at the change point from the drawing process to the pressing process, and the friction property becomes no good.

In the comparative examples 11 to 13, since the interference is applied to the second lip in various kinds of piston rod diameters, however, the material B mentioned above is employed, it is possible to satisfy the friction property but the durability is not sufficient.

In the comparative examples 21 to 23 and 31 to 33, since the material A mentioned above is employed in various kinds of piston rod diameters, the durability can be sufficiently satisfied, however, since the interference applied to the second lip is not within a preferable range, the friction property overshoots at the change point from the drawing process to the pressing process if the interference is a little, and the rear half of the pressing process is formed in a descending wedge-like waveform if the interference is much, so that the friction property becomes no good.

On the contrary, in the examples 1 to 3, 11 to 13 and 21 to 23, since the interference is applied to the second lip in various kinds of piston rod diameters, and the material A mentioned above is employed, it is possible to sufficiently satisfy both of the friction property and the durability.

Therefore, according to the examples 1 to 4, it is recognized that the following operations can be obtained by applying the present invention to the oil seal 20 of the hydraulic shock absorber 10.

(1) By making the inner diameter of the second lip 22 of the oil seal 20 the interference 0.3 to 1.0 mm φ smaller than the outer diameter of the piston rod 13, the rigidity of a whole of the lip is increased, thereby restricting the compressing deformation of the first lip 21 in the drawing process of the piston rod 13 and the expanding deformation of the first lip 21 in the pressing process of the piston rod 13. Accordingly, at the initial period of the pressing process, the first lip 21 closes so as to restrict the increase of the friction, thereby doing away with the overshoot of the friction, and at the initial period of the drawing process, the second lip 22 is brought into contact with the piston rod 13 so as to increase the friction, thereby making the friction waveform described by the friction of the oil seal 20 with respect to the stroke of the piston rod 13 substantially the same friction between the pressing process and the drawing process, and making it substantially the same friction even at the change point between the pressing and drawing processes, so that it is possible to obtain a rectangular ideal waveform. Therefore, the hydraulic shock absorber can obtain a substantially uniform friction in all the processes between the drawing process and the pressing process of the piston rod 13, and it is possible to avoid a waft unstable riding feeling such as preventing the stick slip phenomenon from being generated on the basis of the fact that the friction overshoots at the change point from the drawing process to the pressing process or the like, whereby it is possible to improve a riding feeling.

(2) Since the oil seal 20 is constituted by the NBR (nitrile rubber) (acrylonitrile-butadiene rubber) of the low nitrile (having an amount of nitrile of 24 weight % or less), it is possible to improve a low temperature resistance and it is possible to improve the friction property.

(3) Since the NBR of the low nitrile mentioned in the item (2) is structured such as to contain the chrome oxide or the iron oxide as the abrasion resisting material, it is possible to improve both of the friction property of the oil seal 20 and the durability thereof with a good balance.

(4) Since the oil level angle θ of the first lip 21 is defined within the angle between 45 and 54 degrees, it is possible to improve the durability of the oil seal 20. When increasing the oil level angle θ, the fine stroke durability becomes no good, and when reducing, the large stroke durability becomes no good.

As heretofore explained, embodiments of the present invention have been described in detail with reference to the drawings. However, the specific configurations of the present invention are not limited to the embodiments but those having a modification of the design within the range of the present invention are also included in the present invention. For example, the present invention may be variously structured as far as the oil seal is made of the NBR of the low nitrile and the interference within the range between 0.3 and 1.0 mm φ is applied to the second lip, that is, it is not essential that the material A containing the chrome oxide or the iron oxide as the abrasion resisting material in the NBR is employed, or the oil level angle of the first lip is defined within the range between 45 and 54 degrees.

As mentioned above, according to the present invention, in the hydraulic shock absorber, it is possible to improve a riding feeling of the vehicle by taking the shape of the oil seal and the material thereof into consideration.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. An oil seal of a hydraulic absorber which is sealed at an opening of a cylinder, wherein:
   a core metal comprising a plane plate, is integrally molded with each of a first oil seal lip, a second oil seal lip, a first dust lip, a second dust lip, a check lip, and an outer periphery lip,
   the oil seal is made of a nitrile rubber of a low nitrile which contains abrasion resisting material,
   an inner diameter of the second oil seal lip is within a range of 0.3 and 1.0 mm φ smaller than an outer diameter of a piston rod,
   an oil level angle of the first oil seal lip, formed by a lip forming surface facing to the oil chamber of the first oil seal lip with respect to an outer periphery of the piston rod is defined within a range between 45 and 54 degrees.

2. An oil seal of a hydraulic shock absorber as claimed in claim 1, wherein the abrasion resisting material is one of a chrome oxide and an iron oxide.

3. An oil seal of a hydraulic shock absorber as claimed in claim 1, wherein the abrasion resisting material is a chrome oxide and the chrome oxide is contained in carbon black at a degree of 30 to 60% by weight.

4. An oil seal of a hydraulic shock absorber as claimed in claim 1, wherein the abrasion resisting material is a mixture of a chrome oxide and an iron oxide.

5. An oil seal of a hydraulic shock absorber as claimed in claim 1, wherein the abrasion resisting material is an iron oxide and the iron oxide is contained in carbon black at a degree of 30 to 60% by weight.

* * * * *